(12) United States Patent
Taraki et al.

(10) Patent No.: US 9,374,552 B2
(45) Date of Patent: Jun. 21, 2016

(54) STREAMING GAME SERVER VIDEO RECORDER

(71) Applicant: Amazon Technologies, Inc., Reno, NV (US)

(72) Inventors: Quais Taraki, Bellevue, WA (US); Matthew Vahlsing, Seattle, WA (US); Vinod Murli Mamtani, Bellevue, WA (US); James Jonathan Morris, Duvall, WA (US); Gerard Joseph Heinz, II, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/077,142

(22) Filed: Nov. 11, 2013

(65) Prior Publication Data
US 2015/0131969 A1    May 14, 2015

(51) Int. Cl.
*H04N 5/76* (2006.01)
*H04N 21/218* (2011.01)
*H04N 21/2343* (2011.01)
*H04N 21/2747* (2011.01)
*H04N 5/765* (2006.01)

(52) U.S. Cl.
CPC ........... *H04N 5/76* (2013.01); *H04N 21/21805* (2013.01); *H04N 21/2343* (2013.01); *H04N 21/2747* (2013.01); *H04N 5/765* (2013.01)

(58) Field of Classification Search
CPC .............. H04N 5/76; H04N 21/21805; H04N 21/2343; H04N 21/2747; H04N 5/765
USPC ............................ 386/248, 213, 237, 251, 293
See application file for complete search history.

(56) References Cited

U.S. PATENT DOCUMENTS

| | | | |
|---|---|---|---|
| 5,774,668 A | 6/1998 | Choquier et al. |
| 5,956,489 A | 9/1999 | San Andres et al. |
| 6,343,313 B1 | 1/2002 | Salesky et al. |
| 6,525,731 B1 | 2/2003 | Suits et al. |
| 6,694,346 B1 | 2/2004 | Aman et al. |
| 7,068,729 B2 | 6/2006 | Shokrollahi et al. |
| 7,177,448 B1 | 2/2007 | Sah |
| 7,249,291 B2 | 7/2007 | Rasmussen et al. |
| 7,447,235 B2 | 11/2008 | Luby et al. |
| 7,660,245 B1 | 2/2010 | Luby |
| 7,711,068 B2 | 5/2010 | Shokrollahi et al. |

(Continued)

FOREIGN PATENT DOCUMENTS

WO    WO 2013/069654 A1    5/2013

OTHER PUBLICATIONS

U.S. Appl. No. 14/317,441, filed Jun. 27, 2014, Kalman et al.

(Continued)

*Primary Examiner* — Thai Tran
*Assistant Examiner* — Nien-Ru Yang
(74) *Attorney, Agent, or Firm* — Baker & Hostetler LLP

(57) ABSTRACT

A content provider may operate computing nodes configured to provide graphics rendering services to a client running a game or other application. A graphics frame may be rendered and encoded in a format compatible with a client's display device. A second version of the frame may be encoded in a format having selected storage characteristics and compatible with a plurality of display types. The frame may be added to the end of a video stored by the content provider. Frames may be deleted from the video to prevent the video from exceeding a maximum length.

22 Claims, 9 Drawing Sheets

(56) References Cited

U.S. PATENT DOCUMENTS

| | | | |
|---|---|---|---|
| 7,720,174 B2 | 5/2010 | Shokrollahi et al. | |
| 7,721,184 B2 | 5/2010 | Luby et al. | |
| 7,956,772 B2 | 6/2011 | Shokrollahi et al. | |
| 8,065,676 B1 | 11/2011 | Sahai et al. | |
| 8,185,809 B2 | 5/2012 | Luby et al. | |
| 8,279,755 B2 | 10/2012 | Luby | |
| 8,458,567 B2 | 6/2013 | Luby et al. | |
| 8,473,557 B2 | 6/2013 | Ramakrishnan et al. | |
| 8,478,816 B2 | 7/2013 | Parks et al. | |
| 8,484,284 B2 | 7/2013 | Elliott et al. | |
| 8,527,646 B2 | 9/2013 | Khatib et al. | |
| 8,572,251 B2 | 10/2013 | Srinivas et al. | |
| 8,671,163 B2 | 3/2014 | Luby et al. | |
| 9,192,859 B2 | 11/2015 | Perlman et al. | |
| 2002/0129159 A1 | 9/2002 | Luby et al. | |
| 2003/0091000 A1* | 5/2003 | Chu et al. | 370/230 |
| 2003/0105925 A1 | 6/2003 | Yoshimura et al. | |
| 2003/0212742 A1 | 11/2003 | Hochmuth et al. | |
| 2004/0073903 A1 | 4/2004 | Melchione et al. | |
| 2004/0101274 A1 | 5/2004 | Foisy et al. | |
| 2005/0135305 A1 | 6/2005 | Wentink | |
| 2006/0036756 A1 | 2/2006 | Driemeyer et al. | |
| 2006/0072831 A1 | 4/2006 | Pallister | |
| 2006/0088093 A1 | 4/2006 | Lakaniemi et al. | |
| 2007/0094094 A1 | 4/2007 | Yaron et al. | |
| 2007/0140359 A1 | 6/2007 | Ehret et al. | |
| 2007/0156725 A1 | 7/2007 | Ehret et al. | |
| 2007/0226364 A1 | 9/2007 | Landspurg | |
| 2007/0265073 A1 | 11/2007 | Novi et al. | |
| 2008/0104608 A1 | 5/2008 | Hyser et al. | |
| 2009/0131177 A1 | 5/2009 | Pearce | |
| 2009/0195537 A1 | 8/2009 | Qiu et al. | |
| 2009/0249440 A1 | 10/2009 | Platt et al. | |
| 2009/0251488 A1 | 10/2009 | Clavel | |
| 2009/0307565 A1 | 12/2009 | Luby et al. | |
| 2010/0017686 A1 | 1/2010 | Luby et al. | |
| 2010/0063992 A1 | 3/2010 | Ma et al. | |
| 2010/0156892 A1 | 6/2010 | Chan et al. | |
| 2010/0289803 A1 | 11/2010 | Klosowski et al. | |
| 2010/0312891 A1 | 12/2010 | Pairault et al. | |
| 2011/0002377 A1 | 1/2011 | Raveendran | |
| 2011/0002378 A1 | 1/2011 | Raveendran | |
| 2011/0002379 A1 | 1/2011 | Raveendran | |
| 2011/0002399 A1 | 1/2011 | Raveendran | |
| 2011/0002405 A1 | 1/2011 | Raveendran | |
| 2011/0040894 A1* | 2/2011 | Shrum et al. | 709/246 |
| 2011/0055372 A1 | 3/2011 | Elyashev et al. | |
| 2011/0055602 A1 | 3/2011 | Kamay et al. | |
| 2011/0134111 A1 | 6/2011 | Stone | |
| 2011/0252181 A1 | 10/2011 | Ouye et al. | |
| 2011/0252356 A1 | 10/2011 | Morris | |
| 2011/0276689 A1 | 11/2011 | Rosen | |
| 2011/0283045 A1 | 11/2011 | Krishnan et al. | |
| 2011/0304634 A1 | 12/2011 | Urbach | |
| 2012/0004042 A1 | 1/2012 | Perry et al. | |
| 2012/0005316 A1* | 1/2012 | Perry et al. | 709/219 |
| 2012/0069036 A1 | 3/2012 | Dharmapurikar | |
| 2012/0084774 A1 | 4/2012 | Post et al. | |
| 2012/0089980 A1 | 4/2012 | Sharp et al. | |
| 2012/0173715 A1 | 7/2012 | Selitser et al. | |
| 2012/0188341 A1* | 7/2012 | Klein Gunnewiek et al. | 348/43 |
| 2012/0192031 A1 | 7/2012 | Liu et al. | |
| 2012/0331147 A1 | 12/2012 | Dutta et al. | |
| 2013/0007499 A1 | 1/2013 | Moy | |
| 2013/0016107 A1 | 1/2013 | Dharmapurikar | |
| 2013/0031161 A1 | 1/2013 | Yang | |
| 2013/0036476 A1 | 2/2013 | Roever et al. | |
| 2013/0038618 A1 | 2/2013 | Urbach | |
| 2013/0106855 A1 | 5/2013 | Urbach | |
| 2013/0151683 A1 | 6/2013 | Jain et al. | |
| 2013/0151803 A1 | 6/2013 | Tofano | |
| 2013/0210522 A1 | 8/2013 | Dharmapurikar | |
| 2013/0344961 A1 | 12/2013 | Iannetta | |
| 2013/0344966 A1 | 12/2013 | Mustafa | |
| 2014/0173060 A1 | 6/2014 | Jubran et al. | |
| 2014/0173674 A1 | 6/2014 | Wolman et al. | |
| 2014/0176583 A1 | 6/2014 | Abiezzi et al. | |
| 2014/0279581 A1 | 9/2014 | Devereaux et al. | |
| 2014/0297798 A1 | 10/2014 | Bakalash et al. | |
| 2014/0337835 A1 | 11/2014 | Johnson | |
| 2015/0084981 A1 | 3/2015 | Clarberg | |
| 2015/0091903 A1 | 4/2015 | Costello et al. | |
| 2015/0130789 A1 | 5/2015 | Heinz et al. | |
| 2015/0130813 A1 | 5/2015 | Taraki et al. | |
| 2015/0130814 A1 | 5/2015 | Taraki et al. | |
| 2015/0130815 A1 | 5/2015 | Taraki et al. | |
| 2015/0133214 A1 | 5/2015 | Heath et al. | |
| 2015/0133215 A1 | 5/2015 | Heinz et al. | |
| 2015/0133216 A1 | 5/2015 | Heinz et al. | |
| 2015/0134770 A1 | 5/2015 | Heinz et al. | |
| 2015/0134771 A1 | 5/2015 | Kalman et al. | |
| 2015/0134772 A1 | 5/2015 | Heinz et al. | |
| 2015/0134779 A1 | 5/2015 | Thompson et al. | |
| 2015/0134840 A1 | 5/2015 | Thompson et al. | |
| 2015/0142925 A1 | 5/2015 | Hix et al. | |
| 2015/0249623 A1 | 9/2015 | Phillips et al. | |
| 2015/0331813 A1 | 11/2015 | Perrin et al. | |

OTHER PUBLICATIONS http://commons.wikimedia.org/wiki/File:Stereoscopic_3D_render_from_Blender.jpg; File: Stereoscopic 3D render from Blender.jpg; Wikimedia; Mar. 4, 2012; accessed Nov. 12, 2013; 2 pages.
http://en.wikipedia.org/wiki/Mipmap; Mipmap; Wikipedia; Oct. 29, 2013; accessed Nov. 10, 2013; 3 pages.
http://en.wikipeida.org/wiki/Texture_atlas; Texture atlas; Wikipedia; Sep. 28, 2013; accessed Nov. 10, 2013; 2 pages.
http://msdn.microsoft.com/en-us/library/windows/hardware/ff569022(v=vs.85).aspx; Pipelines for Direct3D Version 11; Microsoft; Oct. 14, 2013; accessed Nov. 9, 2013; 3 pages.

* cited by examiner

STREAMING GAME SERVER VIDEO RECORDER

CROSS REFERENCE TO RELATED APPLICATIONS

This application is related to the following applications, each of which is hereby incorporated by reference in its entirety: U.S. patent application Ser. No. 14/076,718 filed Nov. 11, 2013, entitled "VIDEO ENCODING BASED ON AREAS OF INTEREST"; U.S. patent application Ser. No. 14/076,821 filed Nov. 11, 2013, entitled "ADAPTIVE SCENE COMPLEXITY BASED ON SERVICE QUALITY"; U.S. patent application Ser. No. 14/077,127 filed Nov. 11, 2013, entitled "SERVICE FOR GENERATING GRAPHICS OBJECT DATA"; U.S. patent application Ser. No. 14/077,136 filed Nov. 11, 2013, entitled "IMAGE COMPOSITION BASED ON REMOTE OBJECT DATA"; U.S. patent application Ser. No. 14/077,165 filed Nov. 11, 2013, entitled "MULTIPLE PARALLEL GRAPHICS PROCESSING UNITS"; U.S. patent application Ser. No. 14/077,084 filed Nov. 11, 2013, entitled "ADAPTIVE CONTENT TRANSMISSION"; U.S. patent application Ser. No. 14/077,180 filed Nov. 11, 2013, entitled "VIEW GENERATION BASED ON SHARED STATE"; U.S. patent application Ser. No. 14/077,186 filed Nov. 11, 2013, entitled "MULTIPLE STREAM CONTENT PRESENTATION"; U.S. patent application Ser. No. 14/077,149 filed Nov. 11, 2013, entitled "DATA COLLECTION FOR MULTIPLE VIEW GENERATION"; U.S. patent application Ser. No. 14/076,815 filed Nov. 11, 2013, entitled "LOCATION OF ACTOR RESOURCES"; U.S. patent application Ser. No. 14/077,146 filed Nov. 11, 2013, entitled "SESSION IDLE OPTIMIZATION FOR STREAMING SERVER"; U.S. patent application Ser. No. 14/077,023 filed Nov. 11, 2013, entitled "APPLICATION STREAMING SERVICE"; U.S. Patent Application No. 61/902,740 filed Nov. 11, 2013, entitled "EFFICIENT BANDWIDTH ESTIMATION".

BACKGROUND

Graphics rendering, which may be described as a process for generating images for use in games and other computer applications, may utilize specialized computing resources such as graphics processing units that may not be available on some computing devices. In some cases, even if such resources are available, their use would consume excess power, run at an insufficient speed or provide an insufficient level of graphical quality. Computing devices may therefore be configured to rely on graphics rendering capabilities provided by computing resources located at a remote facility. The facility may, for example, be equipped with banks of graphical processing units ("GPUs") or other hardware specialized for the provision of rendering services. A device such as a game console or mobile phone may offload certain graphics processing tasks to services operated at the remote facility, possibly achieving improved speed and a higher level of detail than the device could achieve on its own.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
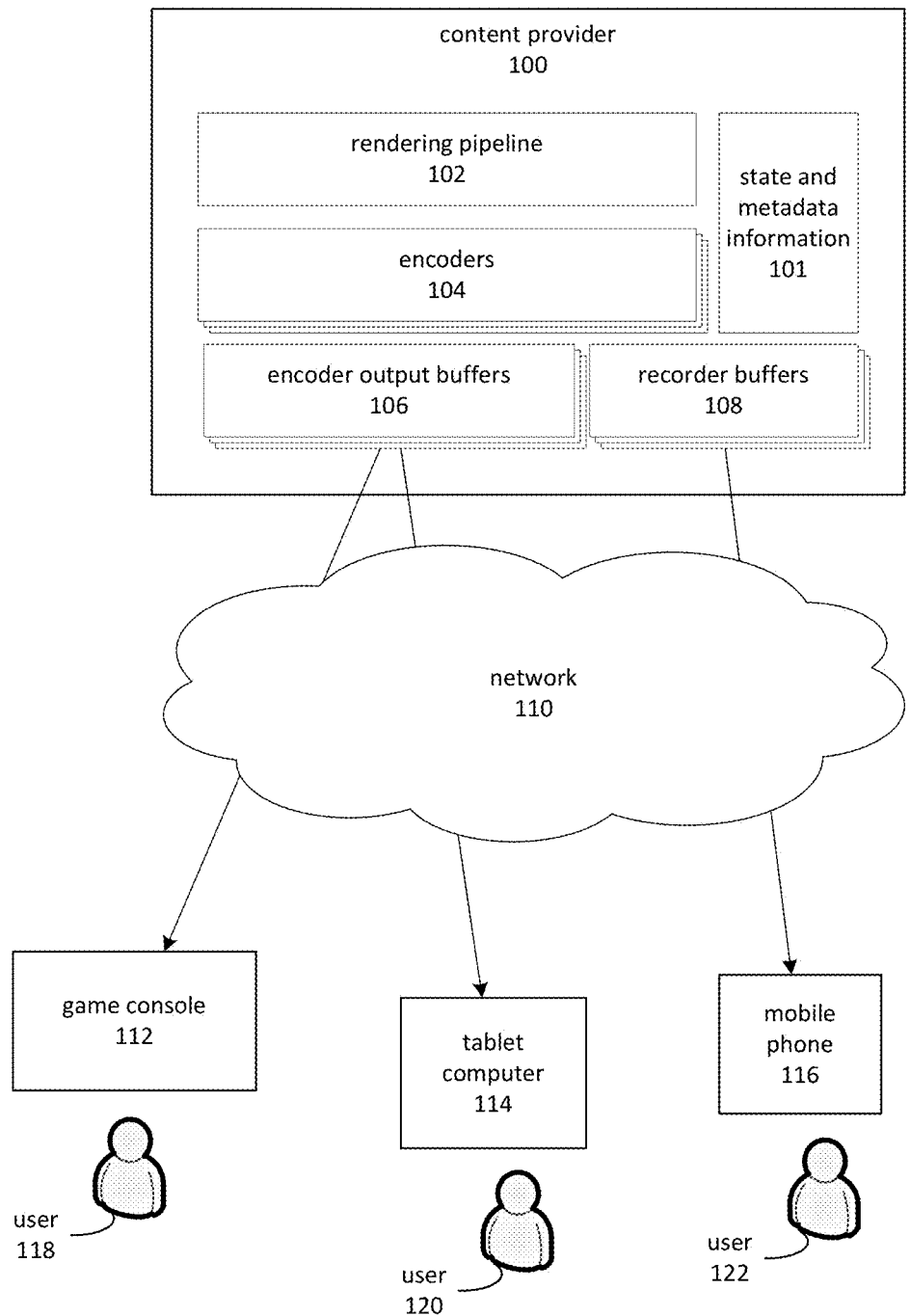
FIG. 1 is a block diagram depicting an example of an embodiment of a system for rendering video for live transmission and recording rendered video for later retransmission.

In accordance with some example features of the disclosed techniques, one or more rendered views of a scene of a particular content item, such as a video game, movie, television program, sports broadcast and so forth, may be generated by a content provider and transmitted from the provider to multiple different clients. A sequence of frames may form a rendered video. In some cases, a content provider may encode rendered frames in a format compatible with a video display device of a client. Embodiments may store a version of the rendered frame in a format compatible with multiple clients. In some cases, frames may be retained to form a rendered video. The rendered video may be associated with a maximum number of frames, or a maximum length of the rendered video. Embodiments may, for example, delete a frame from the beginning of the video when adding a frame to the end, when a count of the number of frames in the sequence exceeds a maximum number of frames. Embodiments might also delete a frame when a replay time of the video exceeds a maximum length. In some embodiments, frames deleted from a video might be transferred to a long term storage device. Rendered videos may be saved to a long-term storage device, transmitted to a client and so forth. A content provider may receive instructions from a client to retain or distribute segments of a rendered video. In various embodiments, a frame may be a composite of all graphics objects, backgrounds and so forth, analogous to a frame of movie or television program. In other embodiments, a frame may be for one or more rendered objects. As used herein, the term frame may apply to a complete scene or to one or more objects. For example, a video game character might comprise various rendered objects corresponding to the characters face, body, and clothing. These might be rendered, encoded, and stored separately from other objects in the rendered content. In a sports broadcast, a rendered object might be arrows, goal lines or other renderings graphical information, which could be superimposed on other graphical images.

In accordance with other example features of the disclosed techniques, a client of a content provider may provide metadata corresponding to events occurring in an application for which the content provider is providing rendering services. An application may be associated with graphical content, such as video content. The term video content may be used to describe various types of graphical or visual output associated with an application. Video content may also be associated with audio. In various embodiments, video content may comprise live video transmissions and recorded video, which may be presented from a different perspective than the live transmission. The content provider may associate metadata with the rendered video, or with a frame of the rendered video. The content provider may receive metadata indicative of factors such as a time corresponding to a frame of the rendered video, an in-game event, a user of the client, and so forth. In some embodiments, a content provider may receive information indicative of relationships between rendered videos. As used herein, the term metadata may refer to data supplied and/or maintained by any combination of a client and/or a content provider. For example, metadata might comprise user information supplied by a client and game state information generated and maintained by a content provider.

FIG. 1 depicts an example of an embodiment of a system for recording, saving, and distributing rendered video. Those of ordinary skill in the art will appreciate that the depicted example is illustrative of various systems and techniques disclosed herein, and should not be construed as limiting the scope of the present disclosure.

A content provider 100 may provide rendering services to one or more clients. A rendering process may comprise one or more computing nodes configured with instructions and/or circuitry corresponding to performing stages of a rendering pipeline 102. Although FIG. 1 shows one rendering pipeline, embodiments may employ a number of rendering pipelines, which may be distributed across multiple computing nodes and may be dynamically allocated. Embodiments may employ encoders 104 to convert rendered bitmaps to a format compatible with various video display types. In some cases, encoders 104 may write encoded frames to encoder output buffers 106 for transmission over network 110 to a client, such as game console 112. In some cases, encoders 104 may write a number of frame formats to encoder output buffers 106. For example, encoders 104 might write frames compatible with tablet computer 114 to encoder output buffers 106. Game console 112 and tablet computer 114 might in some cases receive these rendered frames in real time. For example, game console 112 might receive rendered frames while playing a three-dimensional video game. At the same time, tablet computer 114 might participate in a spectator mode involving user 120 observing a game played on game console 112 by user 118. Frames written to encoder output buffers 106 may be deleted upon transmission to a respective client.

A content provider 100 may have access to state and metadata information 101 corresponding to the rendered frames or objects. In various embodiments, this might comprise complete state information for a game, animated movie or other content. For example, in a game, state and metadata information might comprise a representation of the playing field, location of in-game characters and so forth. Metadata might also correspond to an event in the game, such as completion of a level. In a movie, there might be state and metadata information corresponding to characters in the movie, corresponding actors, plot events and so forth. In various embodiments, metadata and state information may be divided, shared, synchronized or otherwise distributed between a content provider 100 and one or more clients such as game console 112, tablet computer 114 and mobile phone 116.

Embodiments may store a version of encoded frames in recorder buffers 108. Encoded frames may be stored in a format compatible with replaying a sequence of frames on various display types. For example, encoded frames may be stored in recorder buffers 108 in a format determined based in part on clients receiving a real-time transmission of the video. In other cases, encoded frames may be stored in recorder buffers 108 based on compatibility with clients who might view the video at a later time. For example, user 122 might view a video stored in recorder buffers 108 while using a display of mobile phone 116. In various embodiments, video stored in recorder buffers 108 may be transferred to a storage device for long-term storage, and subsequently transmitted to a client, which may for example include game console 112, tablet computer 114 or mobile phone 116.

In some cases, encoders 104 may write frames successively to encoder output buffers 106 and recorder buffers 108. For example, an encoder of encoders 104 might write a frame compatible with video of 1080 lines per frame utilizing a progressive scan format to encoder output buffers 106, and a frame compatible with 480 lines per frame using an interlaced scan format to recorder buffers 108.

Other embodiments may perform actions such as transcoding on a frame stored in encoder output buffers 106 to produce a frame in a second format for storage in recorder buffers 108. In some cases, the format of frames stored in encoder output buffers 106 may be the same as frames to be stored in recorder buffers 108. Some embodiments may, in such cases, copy frames from one location to the other.

Embodiments may utilize combined stages of a rendering pipeline 102 and encoders 104 to produce encoded videos from multiple perspectives. For example, while rendering pipeline 102 and one or more encoders 104 might transmit frames rendered from a first-person perspective to client viewing content live, rendering pipeline 102 and one or more encoders 104 might render and encode frames from an isometric perspective. In various embodiments, state and metadata information may be employed in rendering and encoding a video for recording. For example, a video might be rendered and recorded corresponding to the viewpoint of an opponent, using game state information. Embodiments might employ state and/or metadata information to render additional objects not present in video rendered for live transmission. An embodiment might, for example, render an enhanced version of a projectile or other object and encode the enhanced version in a recorded video.

Figure 2:
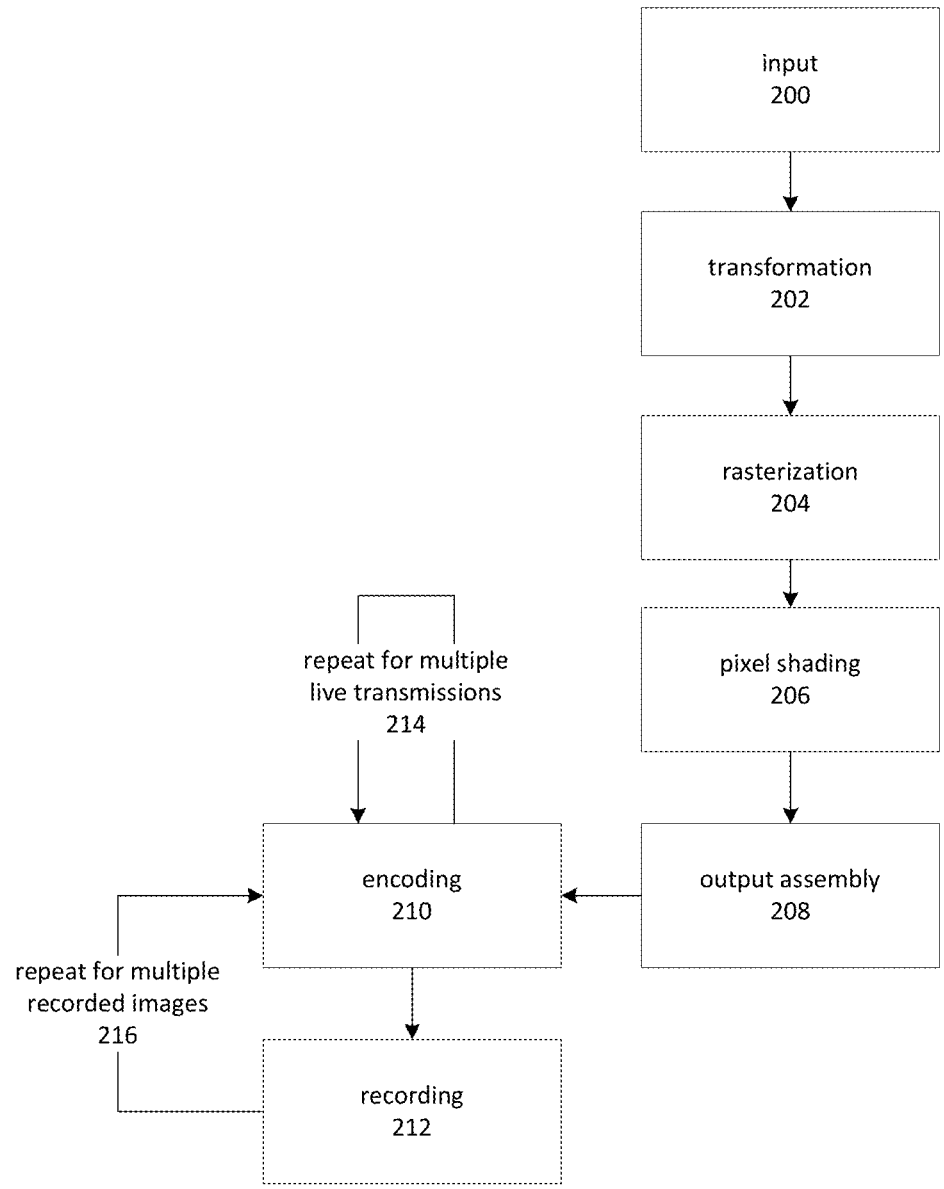
FIG. 2 is a flowchart depicting an example embodiment of a process for rendering, encoding, and storing a graphics frame or object.

FIG. 2 is a flowchart depicting an example embodiment of a process for rendering a graphics frame, encoding the graphics frame for video display, and storing the graphics frame. Although depicted as a sequence of operations, those of ordinary skill in the art will appreciate that the depicted order should not be construed as limiting the scope of the present disclosure and that at least some of the depicted operations may be altered, omitted, reordered or performed in parallel.

FIG. 2 depicts various stages of an illustrative and non-limiting example of a rendering pipeline. Various possible stages of such a rendering pipeline are depicted by operations 200 through 210. A beginning stage of a rendering pipeline may comprise input 200, in which resources such as geometric models, arrays of vertices and so forth may be loaded and prepared for processing in the rendering pipeline. Various preliminary transformations may be performed on models, vertices and other data during this stage.

Operation 202 depicts transformation, in which various mathematical or computational algorithms may be performed on geometric models, vertices and so forth. Various non-limiting examples of transformations include positional, rotational and size transformations. Camera-based transformations, which may be described as transforming data for rendering a graphics scene from a particular viewpoint, may also be performed.

Operation 204 depicts rasterization, which may involve generating pixel-based representations of the graphics scene based on the model. In various embodiments, rasterization may be performed on geometric models, arrays of vertices and so forth after transformation. In some embodiments, rasterization may involve clipping geometric primitives and preparing geometric primitives for pixel shading 206.

As depicted by operation 206, pixel shading may involve processing of rasterized geometric primitives, generating pixel values such as color and/or luminosity and so on. In some cases and embodiments, texture data may be incorporated into pixel shading operation 206.

An output assembly operation 208 may involve incorporating output from previous pipeline stages into pixels determined to be visible in the rendered frame. Pixel values from previous stages may, in some embodiments, be blended to form a pixel shown in the rendered image. Output assembly may involve writing pixels to one or more render targets, which may comprise memory buffers or other structures for storing a rendered image.

Operation 210 may involve encoding the rendered frame in a format compatible for display on a rendering service client's display device. Although depicted as a discrete operation in FIG. 2, in various embodiments encoding operation 210 may be comprised of various encoding pipeline stages. Encoding operation 210 may, in various cases and embodiments, comprise encoding the rendered frame to a format for video display. This may, for example, comprise operations involving resolution, color representation, frames-per-second, interlaced or progressive scan transmission, compression and so forth. Embodiments may encode one or more versions of a rendered frame. Each of these encoded frames corresponds to the same moment in time, or more generally the same moment in an animated sequence. Embodiments may also employ multiple rendering operations to render and encode a number of frames, each of which may be from a different viewpoint but correspond to the same point in time, or the same point in an animated sequence. A different viewpoint may comprise different camera position, distance, orientation and so forth. For example, a second version of a frame might be rendered and encoded from the viewpoint of a different character. Some embodiments may employ combined rendering and encoding operations to produce multiple encoded versions of a frame corresponding to the same point in time.

As indicated by arrow 214, an encoding operation may be repeated for real-time transmission to multiple devices. For example, a game console may be executing an application which is a client of a rendering service of a content provider. Encoding operation 214 may be performed in relation to transmission of rendered video content to the game console, for display on a video display device associated with the game console. Encoding operation 214 may also be performed in relation to transmission of the same rendered video content to another device, on which a user is simultaneously viewing the rendered content. For example, while a user of a game console is playing the game, another user might be viewing the game in a spectator mode on a mobile device. Encoding operations 214 might be performed to encode the rendered video in a format compatible with a display associated with the game console and in a format compatible with a display device associated with the mobile device. Encoding operations may be employed to supply rendered content in a format in which it may be displayed. In addition to rendering video in a format compatible with a display device, this might comprise alternative encodings which might allow rendered content to be displayed. Embodiments may also perform encoding operations to provide for flexible post-encoding operations, such as combination with additional rendered objects, application of filters or other image effects, formation of alternative views, perspectives or zoom levels and so on.

In various embodiments, encoding operations may also be utilized to provide additional encoded video for transmission or recording. The additional encoded video may be used to display content from additional viewpoints or perspectives. For example, in one embodiment state and metadata information may be used to identify in-application events. For the in-application events, a zoomed perspective may be employed. In other embodiments additional views may be provided that are zoomed out to a distance in which all players are captured in the video. In yet another embodiment, a client may send information indicating that an alternative perspective or zoom level should be employed in a version of a video to be replayed later.

Operation 212 involves recording encoded output, which may in some embodiments involve storing output of operation 210. Encoded frames may be stored on storage devices communicatively coupled to computing nodes on which a rendering process is executing. Encoded frames may be buffered so that a video sequence comprising encoded frames is limited by a factor such as a maximum length of the video or a maximum number of frames in the video.

In some cases and embodiments, as depicted by arrow 216, encoding operation 210 may be repeated to encode video in a format for recording. For example, while live video might involve transmission of 720 lines of resolution per frame, recorded video might involve storing 480 lines of resolution per frame. If so, encoding operation 210 might be performed twice, to encode frames for transmission with 720 lines of resolution, and again to encode for recording video at 480 lines of resolution per frame.

Figure 3:
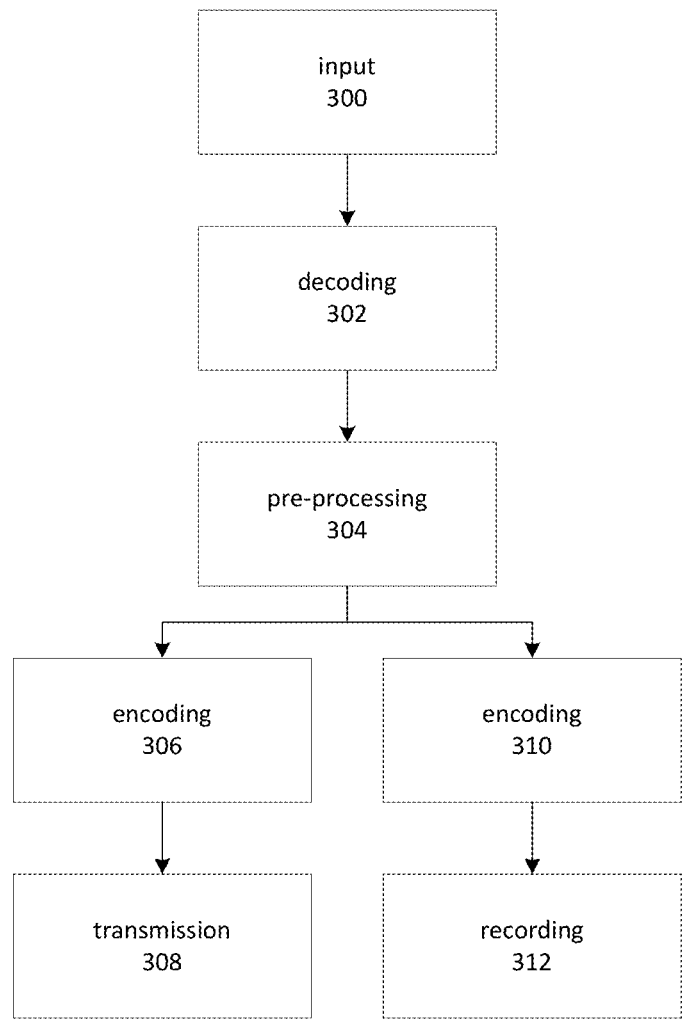
FIG. 3 is a flowchart depicting an example embodiment of a process for encoding rendered video for transmission and recording.

FIG. 3 depicts an illustrative example of an encoding pipeline encoding for transmission and recording. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 300 depicts receiving input for encoding. This may, in some embodiments, comprise rendered frames or sequences of frames from a rendering pipeline. In some cases and embodiments, encoding may proceed on partially formed input. A rendering pipeline and encoding pipeline may, for example, proceed in parallel. In some embodiments, various aspects of graphics processing and encoding may be performed in parallel or in an integrated fashion. Embodiments may, for example, utilize GPU-accelerated encoding.

Operation 302 depicts a decoding stage. In some cases and embodiments, decoding may involve conversion from one format to another format. The destination format may for example comprise normalized representations of data on which subsequent encoding pipeline stages may operate.

As depicted by operation 304, various pre-processing operations may be performed on data in the encoding pipeline. These may comprise various operations common to encoding in each destination format. For example, if each destination format is to be rendered at 1080 pixels per line, a pre-processing operation might convert a rendered image line to 1080 pixels. Various embodiments may omit pre-processing operations.

Operation 306 depicts encoding rendered video in a first encoding format. The encoded video may then be transmitted, as depicted by operation 308. Transmission may comprise buffering frame sequences for transmission to a client device.

Operation 310 depicts performing an additional encoding of the rendered video, to form a version of the rendered frame in a second format. The second format may be compatible with storage requirements of the content provider. This may, for example, comprise compressed or lower-resolution formats allowing for greater storage efficiency. The second format may also be compatible with a broad range of potential display devices. In some cases and embodiments, the second format may be compatible with a device associated with the rendering service client, such as a game console for which the content was originally rendered, as well as additional devices which might view the recorded content, such as a tablet computer or mobile device. A second version of a rendered frame may in some embodiments be rendered from a different viewpoint or perspective than the first version of the frame. For example, a second frame might be rendered and encoded to show the same graphical object or scene, but from a different distance or from the point of view of a different character. The viewpoint used may be based in part on state or metadata corresponding to the current application.

At operation 312, the additional encoding of the rendered frame may be recorded. A frame may be recorded by storing the encoded frame in a temporary or long-term storage location. A temporary location could include a variety of storage device types and mechanisms, including a primary memory of a computing node. Long-term storage could include most types of storage devices and mechanisms, including solid-state and mechanical disk drives, databases and so forth. In either case, some embodiments may retain encoded frames indefinitely. Other embodiments might retain recorded frames up to a maximum length, retaining newly added frames and discarding earliest-added frames.

In various embodiments, output from multiple rendering targets or output from rendering pipelines may be merged. This may, for example, comprise overlaying rendered graphics with copyright information, watermarks, promotional information, information pertaining to in-game events and so forth. In some embodiments, rendered graphics from multiple clients may be overlaid or juxtaposed. For example, in a multiplayer game, multiple game consoles may each utilize rendering services of a content provider. Rendered video from pipelines associated with each user might be merged and encoded in a video comprising the gameplay as viewed by each user.

Figure 4:
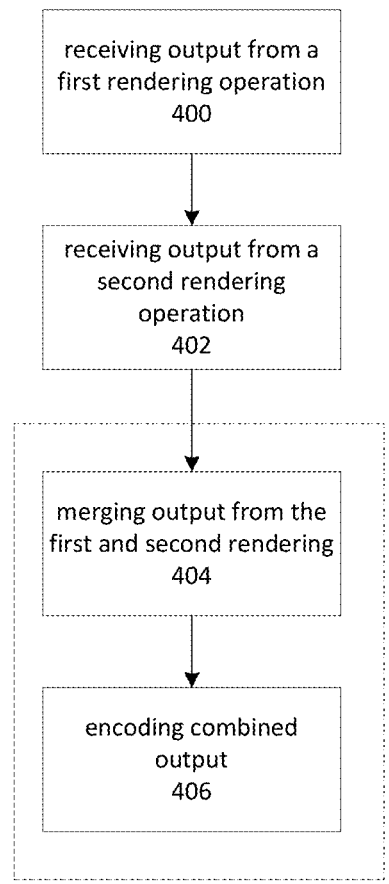
FIG. 4 is a flowchart depicting an example embodiment of a process for merging output and encoding output from multiple rendering operations.

FIG. 4 depicts an example of merging multiple rendering targets or the output of multiple rendering pipelines. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operations 400 and 402 depict receiving output from a first and second rendering operation. In this context, a rendering operation may include, for example, output of a rendering pipeline, output of a stage of a rendering pipeline, and so forth. For example, an embodiment that overlays copyright information might merge output from intermediate stages of a rendering operation, while an embodiment that juxtaposes the viewpoints of players in a multiplayer game might merge output from rendering pipelines. The output of a rendering operation may be described as a graphical element. A graphical element may include, in various non-limiting examples, a rendered frame, a rendered object, text, video, photographs and so forth.

In various embodiments, output from a rendering operation may be altered for optimized combination and/or transformation in the encoding stage. In some embodiments, rendering and encoding pipeline stages may be combined. A wide variety of optimizations and transformations are possible. Embodiments may, for example, encode metadata during the rendering phase that may be employed during the encoding phase, or used for purposes such as indexing. Embodiments may perform partial rendering, render in a format that is optimized for a particular encoding format, render additional objects, render additional perspectives and so on. Various encoding operations may be performed during the rendering stage. Embodiments may spawn additional rendering and/or encoding pipelines in order to provide additional rendering and/or encoding services. In some embodiments, additional pipelines may operate on additional computing nodes, which may be dynamically allocated according to a current level of resource utilization.

Operation 404 depicts merging the output. This may comprise various positional transformations, occlusion, culling and so forth to produce a combined rendered image. The output may then be encoded in a format suitable for recording and display on a desired display device type. In various embodiments, operations 404 and 406 may be performed in parallel or as an integrated operation. For example, an overlay of copyright information might be superimposed on the rendered image during the encoding stage, rather than as a discrete operation.

Figure 5:
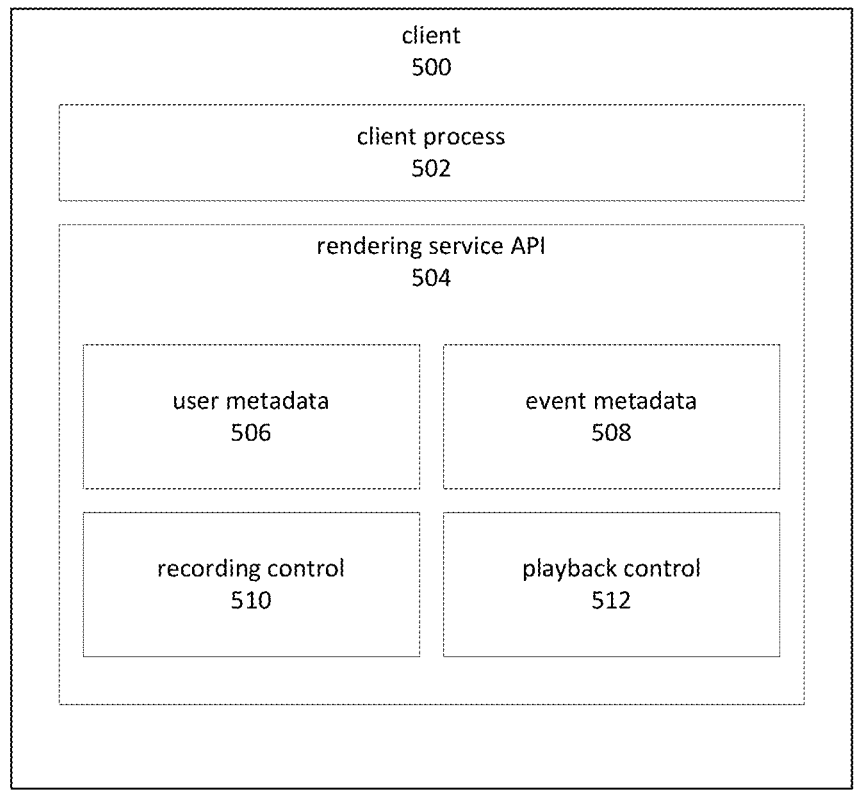
FIG. 5 is a block diagram depicting an illustrative embodiment of a client of a rendering process that transmits requests and data pertaining to controlling recording of rendered video.

Embodiments may provide for control of video recording by a client of a content provider. For example, a client comprising a game console and/or an application running on the game console could issue requests indicative of controlling various aspects of recording and playback. FIG. 5 depicts an embodiment of a system for issuing recording control requests. Those of ordinary skill in the art will appreciate that the depicted example is intended to be illustrative of various possible combinations and permutations, and should not be construed as limiting the scope of the present disclosure.

A client 500 may be various types of devices and/or applications running on devices such as game consoles, smartphones, mobile devices, tablet computers, personal computers and so forth. The term client may refer to the device, to an operating system of a device, an application running on the device, an API used on the device, and so on. For example, in FIG. 5 client 500 might comprise both client process 502 and rendering service API 504. Accordingly, the term client may be used herein to refer to various combinations of hardware devices, circuitry, software applications, software libraries and so forth that may rely collectively or individually on rendering services provided by a content provider.

A client process 502 may consist of various combinations of hardware, circuitry and executable instructions, such as software, that perform some function on a client device. Client process 502 may comprise one or more modules implementing various aspects of an application's functionality. Client processes include, but are not limited to, video games, video playback services, video editing, animation, search, linking, simulation and so forth. Modules may include any combination of computer-readable instructions, circuitry, and so forth. A module may, for example, include statically and dynamically linked libraries, business objects, component objects, graphics processing units, physics processing units and so on. A client process 502 may, in some embodiments, comprise modules receiving input from a user, transmitting information indicative of the input to a content provider, and displaying frames rendered by the content provider. Various additional aspects of gameplay, such as artificial intelligence, maintaining state information representative of the game, and so forth may also be implemented by the content provider. Other embodiments may incorporate greater or lesser amounts of functionality on the client.

One example of an application, among many possible examples, is a game program. Client process 502 might interface with rendering service API 504 to request that rendering services be performed by a content provider on behalf of a client. In various embodiments, an API 504 might also comprise various modules exposing or facilitating the use of various objects, methods, protocols or functions involving control of recording and playback operations performed by a content provider. Non-limiting examples of modules related to control or recording and playback operations include user metadata 506, game event metadata 508, recording control 510 and playback control 512.

User metadata module 506 may involve providing various forms of user-related metadata to the content provider for use in conjunction with video recording. User metadata may comprise information indicative of a user's name, email address, nickname and so forth. A content provider may receive user metadata and store associations between user metadata and recorded video sequences. For example, a video sequence might be stored and associated with a user of the console on which the game corresponding to the video sequence was played.

User metadata is one example of metadata that may be provided by a client and stored by a content provider. Other examples include information related to application publisher, application version, date and time, hardware configuration and so forth. A content provider may store the metadata and record an association between stored metadata and corresponding video sequences. Embodiments may also associate metadata with individual frames of a video sequence, or a subset of frames of a video sequence.

Event metadata module 508 may involve a client providing information to a content provider related to in-game events, which may also be referred to as in-application events. Non-limiting examples of such events are achievement of a high score, winning an in-game contest, finishing a game level and so on. A content provider may receive information sent to it by event metadata module 508. Aspects of the received information may be stored and associated with a video, a subset of frames of a video sequence, or an individual frame of a video sequence. In some cases and embodiments, metadata may pertain to movies, television, broadcast sports events and so on. In one embodiment, rendered graphics may be combined with a broadcast program. Metadata may correspond to various characters, occurrences or other aspects of the broadcast program, and may be associated with a recorded video that combines the rendered graphics with the broadcast program.

Recording control module 510 may involve aspects of controlling recording of video by a content provider on behalf of a client for which the content provider provides rendering services. Aspects of control include, but are not limited to, lengthening or shortening maximum lengths of automatically retained videos, saving automatically retained videos to a long-term storage location, retaining individual frames for long-term storage, controlling resolution of recorded videos and frames, pausing recording, resuming recording, changing perspective of viewing, zooming in, zooming out, panning, shifting perspective, and so forth. A client may transmit or otherwise send a request to a content provider to perform one or more of these and similar actions. For example, a client might send a request to a content provider to permanently retain one or more frames from the last ten seconds of gameplay. In some embodiments, requests to perform an action related to recording control may be sent in a same message as a request to perform a rendering service.

Playback control module 512 may involve aspects of controlling transmission of video previously recorded by a content provider. This may involve a variety of active and passive mechanisms. Examples of active playback control mechanisms include processing a request to send a client a recorded video, or one or more frames from a recorded video. Embodiments may provide for sending recorded video and frames via email, messaging and other communications mechanisms. An example of passive playback control mechanisms involves associating recorded video with users, groups or roles authorized to view the video. Another example involves associating recorded video with metadata comprising information such as date, time, creator, game, game publisher, game category and various other descriptive keywords. Recorded video may also be marked as searchable.

Figure 6:
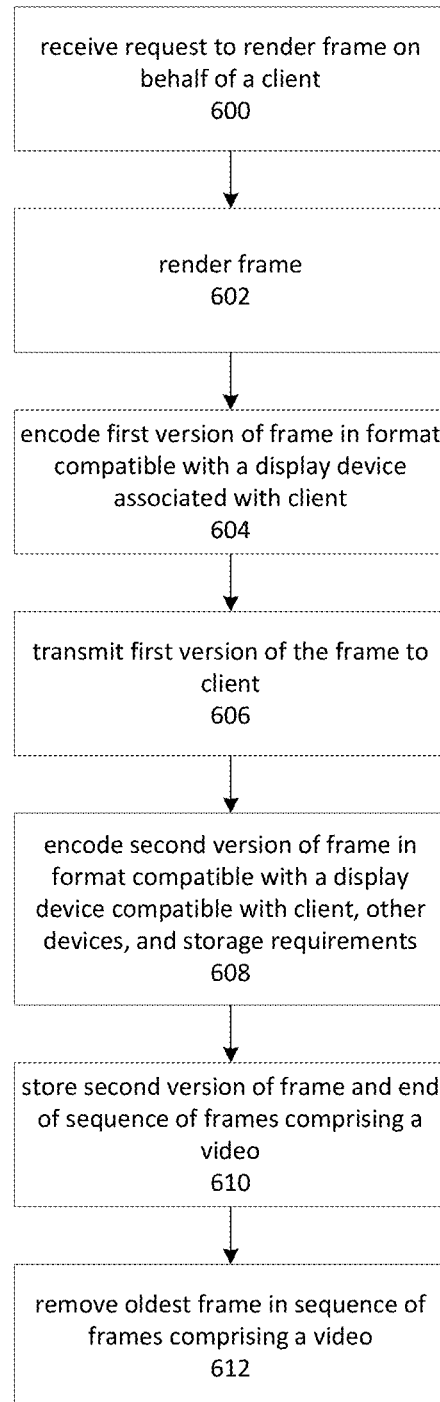
FIG. 6 is a flowchart depicting an example embodiment of a process for responding to requests to render graphics frames or objects and recording encoded versions of the rendered graphics frames or objects.

FIG. 6 depicts an example of an embodiment for processing requests to render graphics frames on behalf of a client and recording rendered frames. As depicted by FIG. 6, a content provider may host a rendering process that renders graphics frames on behalf of a client, and encodes frames for both transmission to the client and retention on a storage device. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 600 depicts receiving a request to render a frame of graphics on behalf of a client. Typically, a frame is one of a sequence of frames rendered to form an animated sequence, or more generally a video. A video may be described as comprising a sequence of frames, ordered in time such that the first frame corresponds to the earliest time of the video, and the last frame corresponds to the latest time of the video. In some formats, such as an interlaced format, a rendered frame may span more than one refresh cycle in an encoded file.

At operation 602, the request frame may be rendered by a rendering process hosted by a content provider. A rendering process may utilize resources such as geometric models, textures and so forth stored by the content provider and associated with a game or other process running on a client. A rendering process may utilize a rendering pipeline such as the one depicted in FIG. 2 to produce a rendered graphics frame.

Operation 604 depicts encoding a first version of the rendered graphics frame in a format compatible with a display device associated with the client. In some embodiments, this format may be optimized for real-time transmission to the client. A client may supply information such as a desired minimum frame rate, such as 60 frames per second. A format for encoding for live transmission may be selected based in part on the desired frame rate. Other possible factors may include, but are not limited to, resolution, color density, compression ratios and so forth.

Operation 606 depicts transmitting the first version of the frame to a client. In some cases and embodiments, the frame may be transmitted to a client that had issued a corresponding request to perform a rendering operation, and to one or more additional clients operating in spectator mode. Embodiments may perform multiple encoding operations to form additional versions of the rendered frame, in formats compatible with other devices operating in a spectator mode.

Operation 608 depicts encoding a second version of the rendered frame in a format compatible with a display device associated with a client, as well as with additional display device types which may not be known at encoding time, but may be used to view the video after it has been recorded. The format of the second version may also be compatible with storage requirements. It may, for example, be desirable to store video in a format that is more space-efficient than the transmitted format. Some embodiments might record video in a format that graphically improves upon the transmitted frame. For example, if the original video was rendered for a mobile device, embodiments might transmit video in real time using a low-definition format, but store video using a high-definition encoding format.

In some cases and embodiments, the first and second formats may be the same. Embodiments may therefore use the first encoded version of the rendered frame as the second encoding version, and a step for encoding the second version may involve only copying the first version while storing it.

Operation 610 depicts storing the second version of the encoded frame. Embodiments may employ a variety of storage locations and storage strategies. Non-limiting examples include a primary memory of a computing node of the content provider, a storage device such as a solid-state or mechanical disk drive, a database and so on. Some embodiments may retain a certain number of frames on one type of device and archive frames on another type.

As depicted by operation 612, embodiments may remove the oldest frame in a sequence of frames upon adding a new frame to the end of the sequence. Removal of the oldest frame may be conditioned upon exceeding a threshold value. The threshold value may correspond to a maximum number of frames, a playback time of the sequence of frames and so forth. The earliest frame in a sequence of frames may be removed upon adding a new frame to the sequence and determining that the threshold has been exceeded. Content providers may receive requests or other information from a client that indicates an adjustment to the threshold value.

Figure 7:
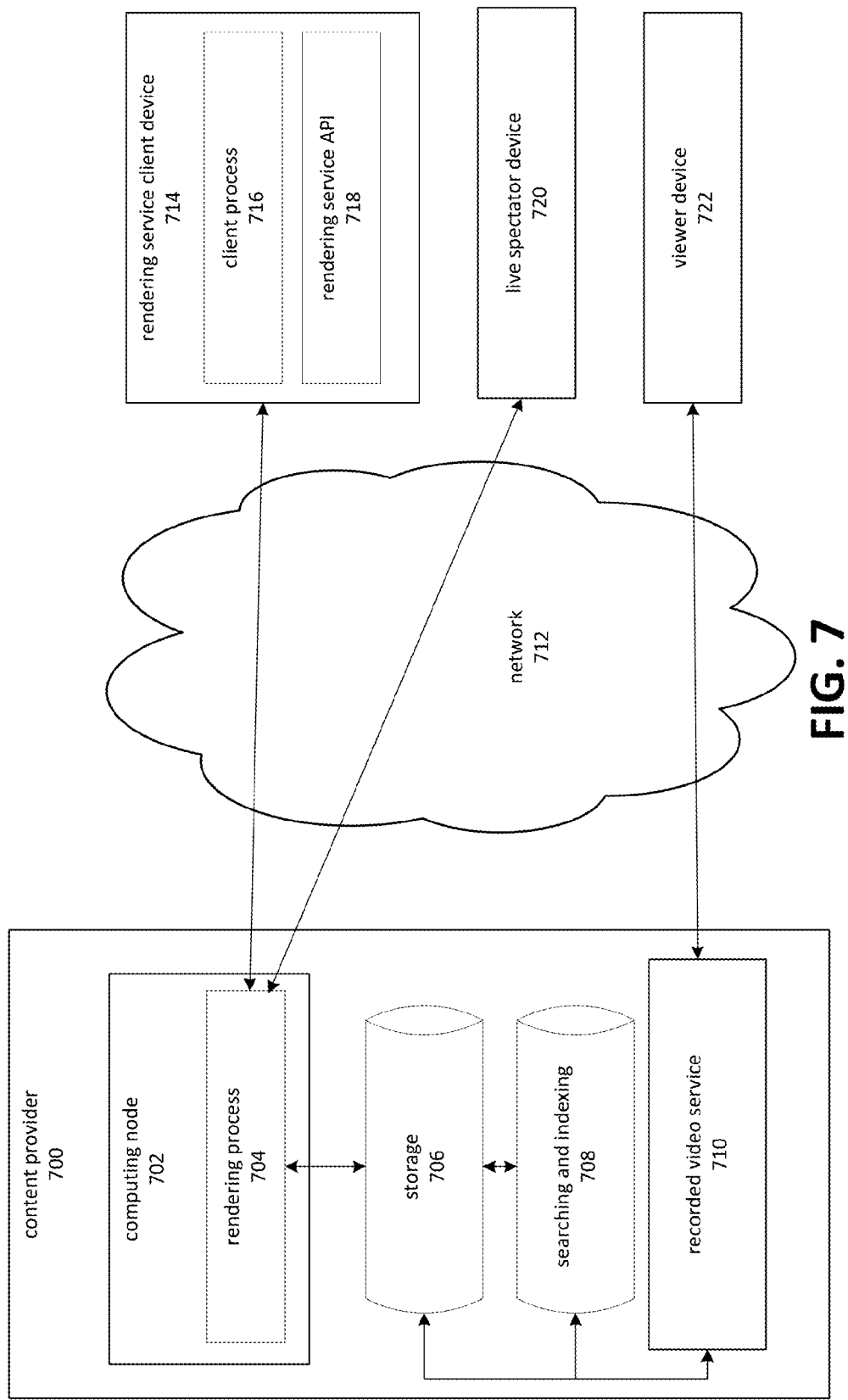
FIG. 7 is a block diagram depicting an example of a system for rendering, recording, and transmitting rendered graphics, including recorded versions of rendered graphics.

FIG. 7 depicts an example of a system for rendering, transmitting and recording graphics frames on behalf of various clients. Those of ordinary skill in the art will appreciate that the depicted example is intended to be illustrative of various possible combinations and permutations, and should not be construed as limiting the scope of the present disclosure.

A content provider 700 may operate one or more computing nodes, such as computing node 702, on which rendering process 704 may operate. In some cases and embodiments, a rendering process may correspond to an instance of an executable application. However, a rendering process may instead comprise component invocations, library calls, objects, multiple instances of an executable application and so on.

A rendering process may be associated with a set of one or more clients, such as client 714. A client process 716 may operate on client 714. Client process 716 may be a game or other application which may rely on the graphics rendering services of content provider 700. A rendering service API 718 may be used in conjunction with client process 716, or in conjunction with an operating system of client 714, to provide rendering services.

A content provider 700 may associate client 714, or an aspect thereof such as client process 716, with rendering process 704. Application 714 may issue requests to rendering process 704 to render graphics frames. Requests may be issued through rendering service API 718. Frames rendered by rendering process 704 in response to the requests may be transmitted in real time to client 714 or an element thereof. A network 712, such as the Internet, may be used as a transmission medium. As used herein, the term "real time" means while application 714 is running, and within a time frame sufficient to provide an impression, to a user of client 714, that the graphics are rendered in response to events occurring in client process 716. The term "real time" may also be defined in terms of contrast with after-the-fact viewing. For example, a user of client 714 might view video in real time while actively playing a game corresponding to client process 716. Later, he might view a replay of the gameplay. The latter case is not real time. A live spectator 720 may also receive frames rendered by rendering process 704 in real time.

Frames rendered by rendering process 704 may be retained in one or more storage devices, such as storage 706. Embodiments may associate storage 706 with searching and indexing 708, which may comprise indexes describing recorded frames or sequences of frames. Indexing may refer to any of various techniques for allowing data to be located or accessed. In some embodiments, storage 706 and searching and indexing 708 may be integrated, for example by storing data in a relational database. Embodiments may store associations between metadata and recorded frames or sequences of frames. For example, recorded frames and sequences of frames may be stored in association with distribution format exchange profile ("DFXP"), which may also be referred to as time and text markup language. Other embodiments may store tags in an index which refers to frames or sequences of frames. In various cases and embodiments, recorded video may be associated with timestamps, time codes, subtitles, copyright information and so forth. The term "timestamp" may be used to refer to any form of date and/or time information, including absolute date or time values, relative date and/or time values and offsets. Recorded video may, in some embodiments, be associated with session information, such as the date and time a game was played, the users involved, the game played and so on. Associations may also be recorded between video recorded by multiple users, such as multiple users involved in a common multiplayer game. In some embodiments, users may provide annotations which may be associated with recorded videos or particular frames of a recorded video. Annotations may be textual, audio, visual or some combination thereof. Annotations may also comprise various forms of metadata such as timestamps, comments, information about game events, publisher information, game information, and so forth.

A recorded video service 710 may perform various services in conjunction with storage 706 and/or indexing 708. For example, recorded video service 710 may utilize index 708 to provide search features related to recorded video. In various cases and embodiments, video may be searched during or after it is recorded.

Recorded video may be transmitted to viewer device 722, which may be a device capable of displaying received video transmissions. In some embodiments, recorded video service 710 may response to a request from viewer device 722 to transmit one or more frames associated with recorded video. The request by viewer device 722 may be in response to searches performed on behalf of viewer device 722 by recorded video service 710. For example, recorded video service 710 might provide a web page which lists recorded video pertaining to a game. A user of viewer device 722 might select one of these for viewing. In response, recorded video service 710 might retrieve the video from storage 706 and transmit it to viewer device 722.

Figure 8:
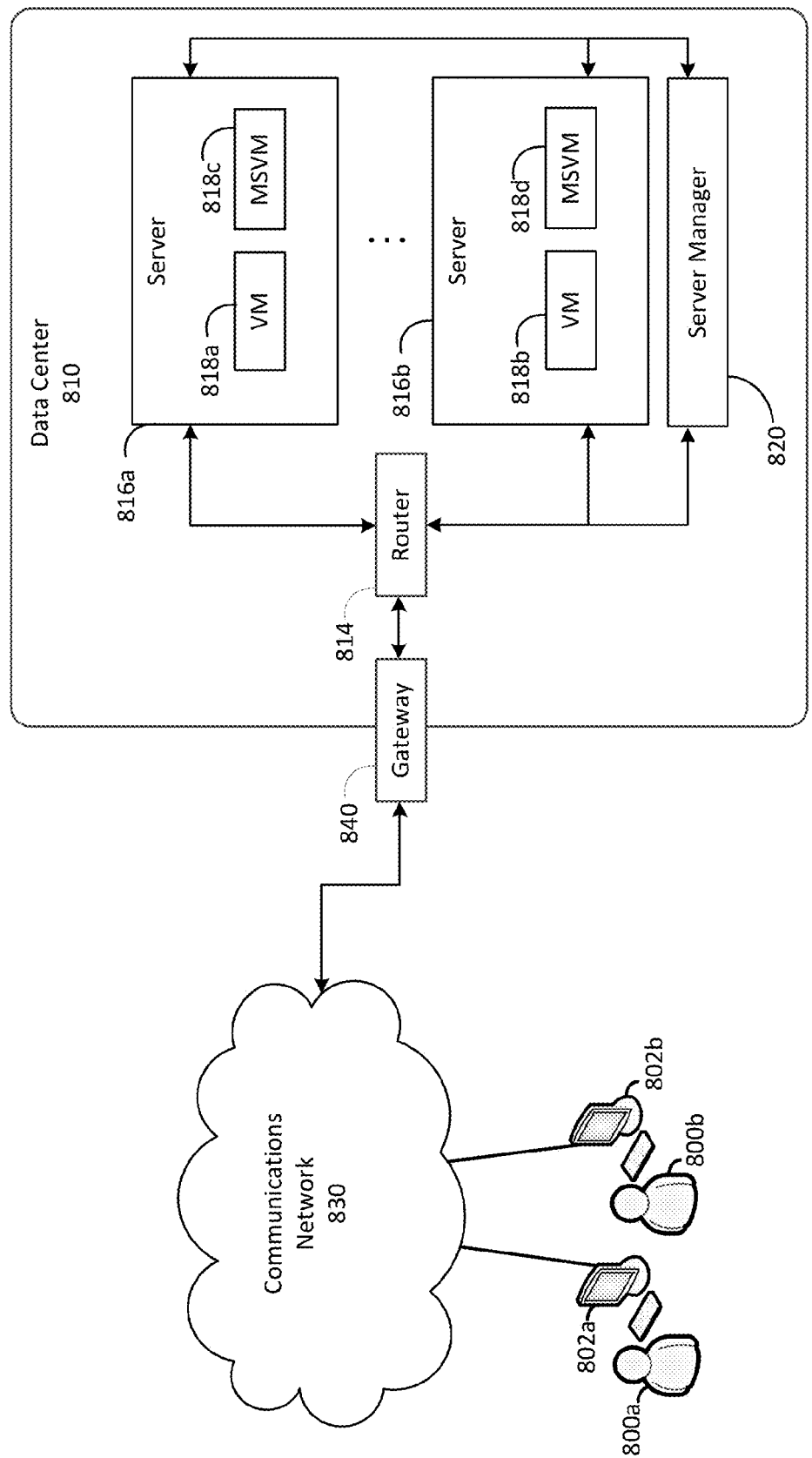
FIG. 8 is a block diagram depicting an example computing system that may be used in some embodiments.

A content provider may, in some cases, render and transmit content item views to clients over an electronic network such as the Internet. Content may, in some cases, be provided upon request to clients using, for example, streaming content delivery techniques. An example computing environment that enables rendering and transmission of content to clients will now be described in detail. In particular, FIG. 8 illustrates an example computing environment in which the embodiments described herein may be implemented. FIG. 8 is a diagram schematically illustrating an example of a data center 810 that can provide computing resources to users 800*a* and 800*b* (which may be referred herein singularly as user 800 or in the plural as users 800) via user computers 802*a* and 802*b* (which may be referred herein singularly as computer 802 or in the plural as computers 802) via a communications network 830. Data center 810 may be configured to provide computing resources for executing applications on a permanent or an as-needed basis. The computing resources provided by data center 810 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 810 may include servers 816*a-b* (which may be referred herein singularly as server 816 or in the plural as servers 816) that provide computing resources. These resources may be available as bare metal resources, or as virtual machine instances 818*a-d* and (which may be referred herein singularly as virtual machine instance 818 or in the plural as virtual machine instances 818). Virtual machine instances 818*c* and 818*d* are shared state virtual machine ("SSVM") instances. The SSVM virtual machine instances 818*c* and 818*d* may be configured to perform all or any portion of the shared content item state techniques and/or any other of the disclosed techniques in accordance with the present disclosure and described in detail below. As should be appreciated, while the particular example illustrated in FIG. 8 includes one SSVM virtual machine in each server, this is merely an example. A server may include more than one SSVM virtual machine or may not include any SSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 8, communications network 830 may, for example, be a publicly accessible network of linked networks and possibly operated by various distinct parties, such as the Internet. In other embodiments, communications network 830 may be a private network, such as a corporate or university network that is wholly or partially inaccessible to non-privileged users. In still other embodiments, communications network 830 may include one or more private networks with access to and/or from the Internet.

Communication network 830 may provide access to computers 802. User computers 802 may be computers utilized by users 800 or other customers of data center 810. For instance, user computer 802*a* or 802*b* may be a server, a desktop or laptop personal computer, a tablet computer, a wireless telephone, a personal digital assistant (PDA), an e-book reader, a game console, a set-top box or any other computing device capable of accessing data center 810. User computer 802*a* or 802*b* may connect directly to the Internet (e.g., via a cable modem or a Digital Subscriber Line (DSL)). Although only two user computers 802*a* and 802*b* are depicted, it should be appreciated that there may be multiple user computers.

User computers 802 may also be utilized to configure aspects of the computing resources provided by data center 810. In this regard, data center 810 might provide a gateway or web interface through which aspects of its operation may be configured through the use of a web browser application program executing on user computer 802. Alternately, a stand-alone application program executing on user computer 802 might access an application programming interface (API) exposed by data center 810 for performing the configuration operations. Other mechanisms for configuring the operation of various web services available at data center 810 might also be utilized.

Servers 816 shown in FIG. 8 may be standard servers configured appropriately for providing the computing resources described above and may provide computing resources for executing one or more web services and/or applications. In one embodiment, the computing resources may be virtual machine instances 818. A virtual machine instance may be referred to as a virtual machine. As discussed above, each of the virtual machine instances 818 may be configured to execute all or a portion of an application. In the example of virtual machine instances, Data center 810 may be configured to execute an instance manager 820*a* or 820*b* (which may be referred herein singularly as instance manager 820 or in the plural as instance managers 820) capable of executing the virtual machine instances 818. The instance managers 820 may be a virtual machine monitor (VMM) or another type of program configured to enable the execution of virtual machine instances 818 on server 816, for example. It will be appreciated that the configuration of instance managers 820, as depicted by FIG. 8, is subject to change and that instance managers 820 may, for example, be configured to operate as a front-end to router 814. In some embodiments, instance managers 820 may be hosted on servers 816, or on other computing nodes.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 810 shown in FIG. 8, a router 814 may be utilized to interconnect the servers 816a and 816b. Router 814 may also be connected to gateway 840, which is connected to communications network 830. Router 814 may be connected to one or more load balancers, and alone or in combination may manage communications within networks in data center 810, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 810 described in FIG. 8 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 9:
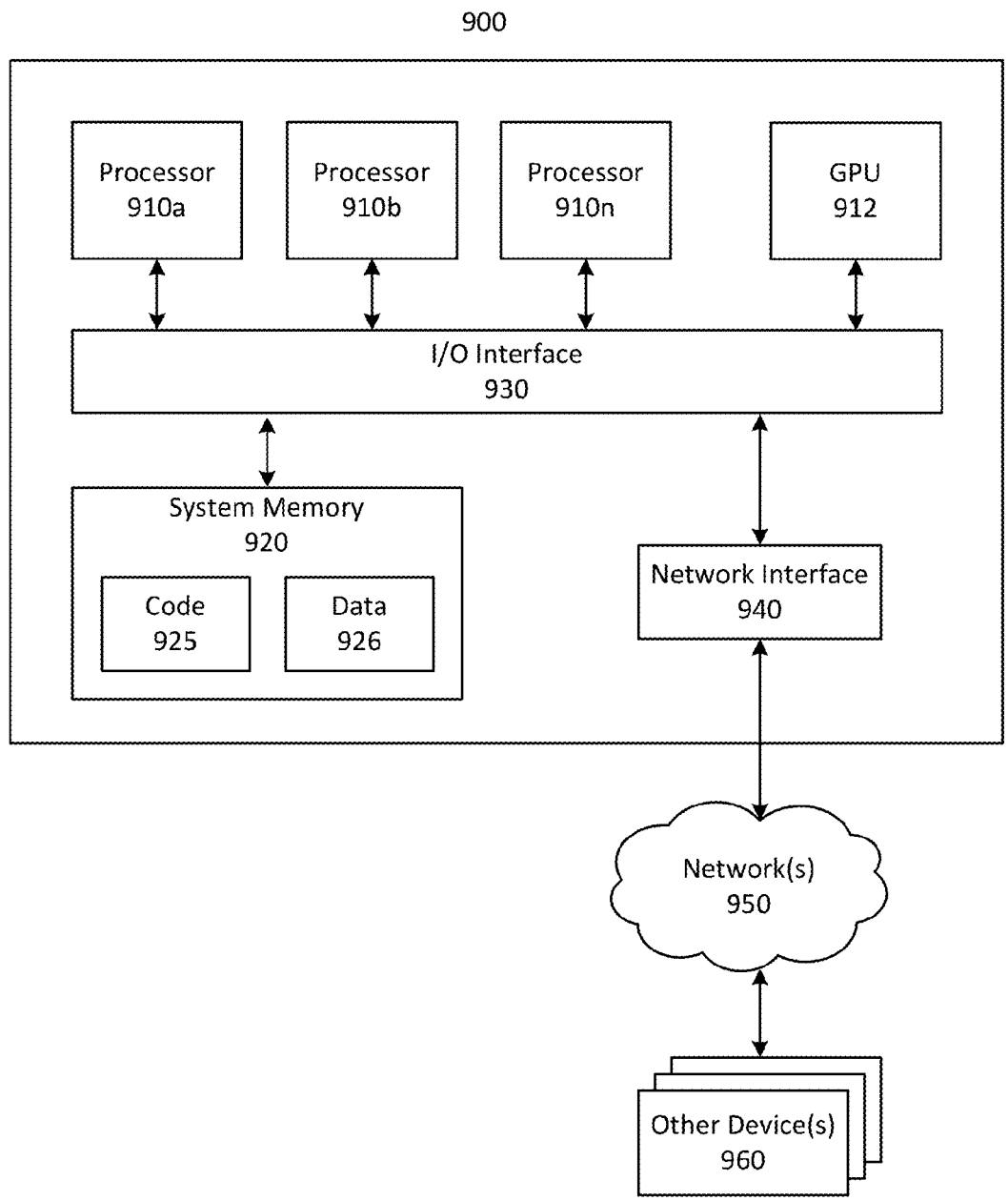
FIG. 9 is a block diagram depicting an example computing system that may be used in some embodiments.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910a, 910b and/or 910n (which may be referred herein singularly as a processor 910 or in the plural as the processors 910) coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC or MIPS ISAs or any other suitable ISA. In multiprocessor systems, each of processors 910 may commonly, but not necessarily, implement the same ISA.

In some embodiments, a graphics processing unit ("GPU") 912 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 920 as code 925 and data 926.

In one embodiment, I/O interface 930 may be configured to coordinate I/O traffic between processor 910, system memory 920 and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 920 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 900 via I/O interface 930. A non-transitory computer-accessible storage medium may also include any volatile or non-volatile media such as RAM (e.g. SDRAM, DDR SDRAM, RDRAM, SRAM, etc.), ROM etc., that may be included in some embodiments of computing device 900 as system memory 920 or another type of memory. Further, a computer-accessible medium may include transmission media or signals such as electrical, electromagnetic or digital signals conveyed via a communication medium such as a network and/or a wireless link, such as those that may be implemented via network interface 940. Portions or all of multiple computing devices such as those illustrated in FIG. 9 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for recording video content, the system comprising:
one or more storage devices; and
one or more computing nodes communicatively coupled to the one or more storage devices, the one or more computing nodes configured to operate a service for rendering graphics on behalf of a first client remote to the one or more computing nodes, the one or more computing nodes further configured at least to:
run an application, the application including video content;
render a first frame on behalf of the first client;
encode the first frame of the video content in a first format compatible with a first display type, the first display type corresponding to a display of the first client;
transmit the first frame to the first client;
store a second frame of the video content in a sequence of frames stored on the one or more storage devices, the second frame corresponding to a time of the first frame, the second frame encoded in a second format compatible with a plurality of display types, the plurality of display types comprising the first display type;
determine that a threshold length of the sequence of frames has been exceeded, the determining based at least in part on a count of frames in the sequence of frames stored on the one or more storage devices; and remove an earliest frame from the sequence of frames stored on the one or more storage devices upon determining that the threshold has been exceeded, the earliest frame corresponding to a time prior to the first frame.

2. The system of claim 1, the one or more computing nodes further configured at least to:
receive information indicative of at least one of an identity of a user of the first client, a client process, a session, a timestamp, an annotation, or a publisher; and
store, on the one or more storage devices, an association between the sequence of frames and the information.

3. The system of claim 1, the one or more computing nodes further configured at least to:
receive information indicative of at least one of a timestamp, an annotation, or an event that occurred in a process executing on the first client; and
store, on the one or more storage devices, an association between at least one frame of the sequence of frames and the information indicative of the event.

4. The system of claim 1, the one or more computing nodes further configured at least to:
render the second frame of the video content from a viewpoint different from a viewpoint of the first frame, wherein the viewpoint comprises at least one of distance, position, or orientation.

5. A method of recording video formed by a rendering service operating on one or more computing nodes remote to a first client, the method comprising:
rendering, by the rendering service on behalf of the first client, a first frame of video content for an application, the first frame encoded in a first format compatible with a first display type corresponding to a display of the first client;
transmitting the first frame to the first client;
storing a second frame of the video content in a sequence of frames stored on one or more storage devices of the one or more computing nodes, the second frame corresponding to a time of the first frame, the second frame encoded in a second format compatible with one or more display types, the one or more display types comprising the first display type; and
deleting at least one frame from the sequence of frames stored on the one or more storage devices based at least in part on a determination that a count of frames in the sequence of frames stored on the one or more storage devices is greater than a threshold length of the sequence of frames.

6. The method of claim 5, further comprising:
storing an association between the sequence of frames and information indicative of at least one of an identity of a user of the first client, a client process, a session, a timestamp, an annotation, or a publisher.

7. The method of claim 5, further comprising:
storing an association between at least one frame of the sequence of frames and information indicative of at least one of state information or metadata for the application.

8. The method of claim 5, further comprising:
transmitting a copy of the second frame to a second client.

9. The method of claim 8, wherein a display of the second client is compatible with an additional display type other than the first display type.

10. The method of claim 5, further comprising:
rendering the second frame of the video content from at least one of a different distance, position, or orientation than the first frame.

11. The method of claim 5, further comprising:
rendering, by the rendering service, a graphical element; and
forming a third frame by overlaying or juxtaposing the graphical element with the first frame.

12. The method of claim 5, further comprising:
forming an index based at least in part on metadata associated with a frame of the sequence of frames.

13. The method of claim 5, further comprising:
rendering the second frame based at least in part on state information maintained by the one or more computing nodes, the state information corresponding to the application.

14. The method of claim 5, wherein the one or more storage devices comprises a memory of at least one of the one or more computing nodes.

15. The method of claim 5, further comprising recording an association between a timestamp and the second frame.

16. A non-transitory computer-readable storage medium having stored thereon instructions that, upon execution by one or more computing devices, cause the one or more computing devices at least to:
render, by a rendering service on behalf of the first client, operating on one or more computing nodes, a first frame of video content, the first frame encoded in a first format compatible with a first display type corresponding to a display of a first client remote to the one or more computing nodes;
send the first frame to the first client;
store a second frame of the video content in a first sequence of frames stored on one or more storage devices of the one or more computing nodes, the second frame corresponding to a time of the first frame, the second frame encoded in a second format compatible with the first display type and a second display type; and
delete an earliest frame from the first sequence of frames stored on the one or more storage devices based at least in part on a determination that a count of frames in the sequence of frames stored on the one or more storage devices is greater than a threshold length of the sequence of frames.

17. The non-transitory computer-readable medium of claim 16, comprising further instructions that, upon execution by the one or more computing devices, cause the one or more computing devices to at least:
store metadata corresponding to the first sequence of frames on the one or more storage devices.

18. The non-transitory computer-readable medium of claim 16, comprising further instructions that, upon execution by the one or more computing devices, cause the one or more computing devices to at least:
transmit a copy of the second frame to a second client.

19. The non-transitory computer-readable medium of claim 16, comprising further instructions that, upon execution by the one or more computing devices, cause the one or more computing devices to at least:
store a second sequence of frames on the one or more storage devices upon receiving a request indicative of storing the second sequence of frames, the second sequence of frames comprising one or more frames of the first sequence of frames.

20. The non-transitory computer-readable medium of claim 19, wherein the request is sent by the first client in response to an in-game event.

21. The non-transitory computer-readable medium of claim 16, comprising further instructions that, upon execution by the one or more computing devices, cause the one or more computing devices to at least:

receive, from the first client, information indicative of the second format.

22. The non-transitory computer-readable medium of claim 16, comprising further instructions that, upon execution by the one or more computing devices, cause the one or more computing devices to at least:

transmit the second frame to one or more additional clients.

* * * * *